United States Patent Office 2,870,427
Patented Jan. 20, 1959

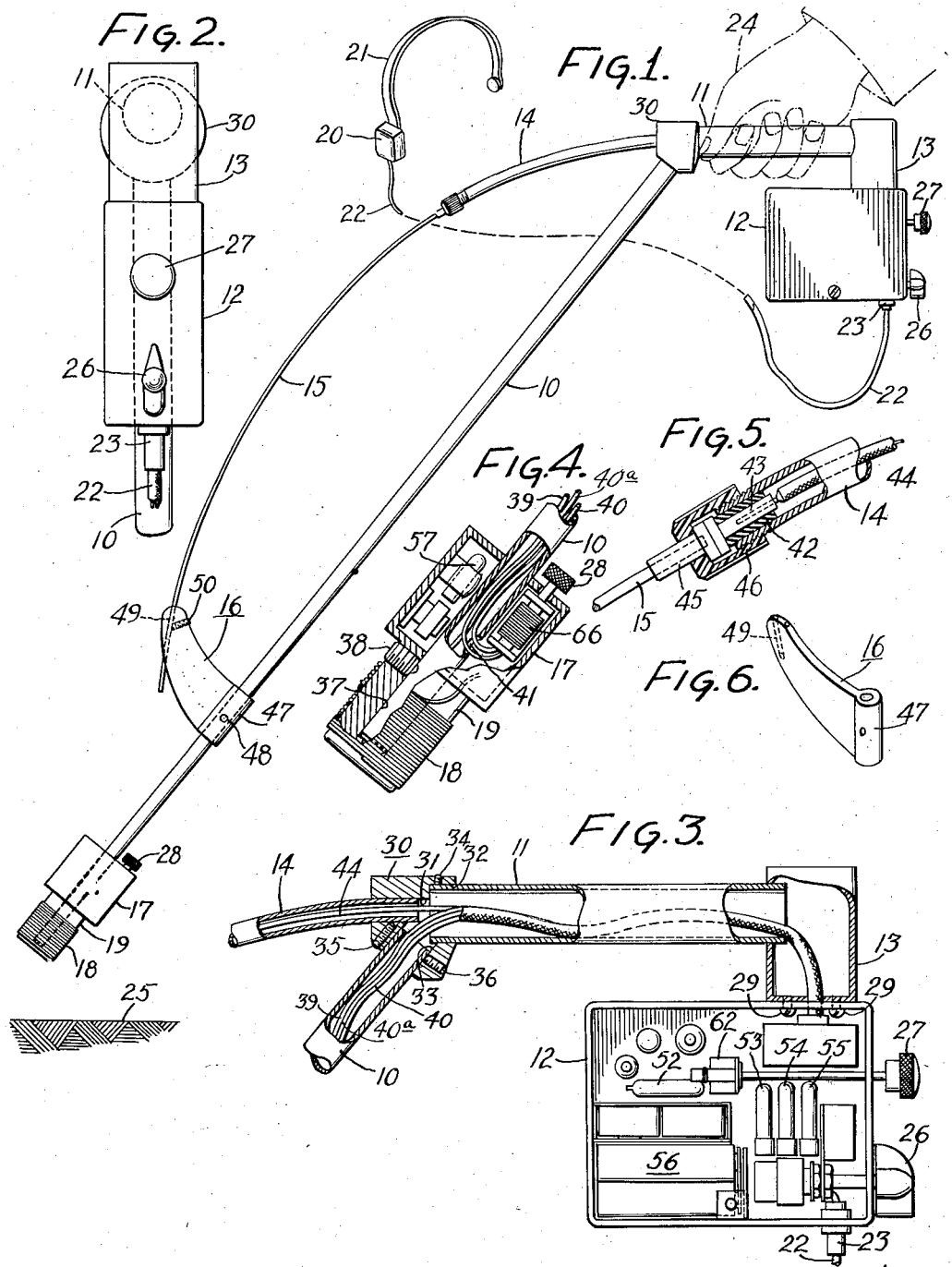

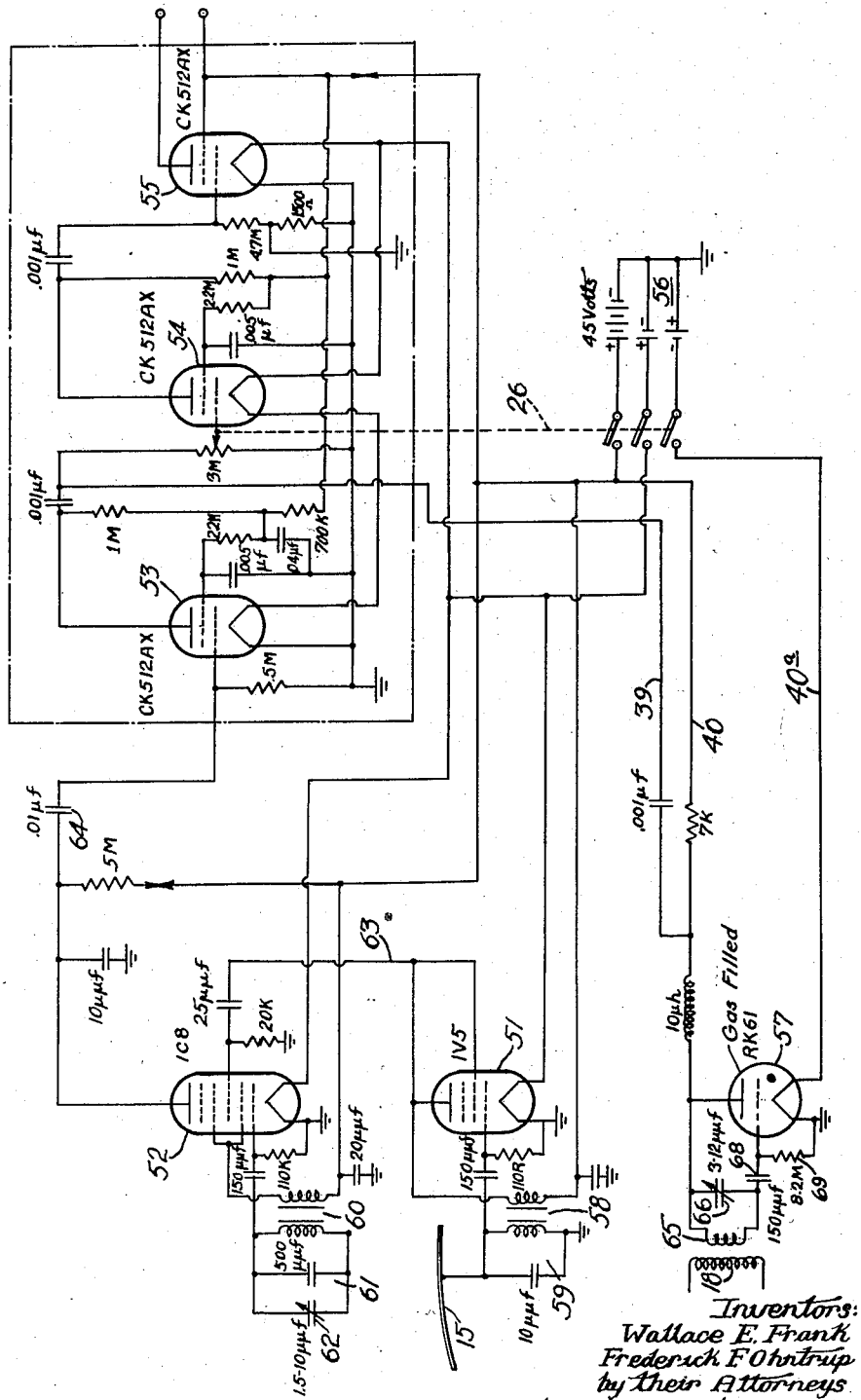

2,870,427

DEVICE FOR DETECTING AND INDICATING PROXIMITY OF OBJECTS

Wallace E. Frank, Kintnersville, and Frederick F. Ohntrup, Philadelphia, Pa., assignors to W. K. Kellogg Foundation, Battle Creek, Mich., a corporation of Michigan Application March 11, 1952, Serial No. 276,018

5 Claims. (Cl. 340—16)

This invention relates to devices for detecting and indicating proximity of objects. One use to which the invention may be applied is the guidance of blind persons, or persons having poor vision.

In the past, devices of this general character have operated on the principle of reflection of radiated energy, and therefore such devices have required the provision of radiating and receiving equipment, and they have been necessarily complex and expensive.

The principal object of the present invention is to provide an object detection device which is relatively simple in construction and operation, and which is particularly characterized in that it senses the presence of a proximate object without utilizing the principle of reflection. This result is achieved, according to the invention, by the provision of an arrangement whereby an object-sensing antenna causes alteration of the output of a high-frequency oscillator, and this causes production of an electrical signal which may be translated into a signal perceptible to the user.

Another object of the invention, as applied to guidance of blind persons, is to provide a device which, in addition to obstacle detection is adapted to detect variations in the ground level. Thus, the device is capable of detecting the presence of steps, or any other variation in ground level. This result is achieved by the provision of a second antenna arranged to sense ground level variations, and the provision of means responsive to the sensing of such variations to produce a signal which may be made distinct from the obstacle-indicating signal.

Still another object of the invention is to provide a device of cane-like configuration which may be carried about much the same as a cane.

Other objects and features of the invention will be apparent from the following detailed description with reference to the accompanying drawing, in which Fig. 1 is a side elevational view of one form of the invention as applied to a guidance device for use by blind persons or persons having poor vision;

Fig. 2 is a rear elevational view of the main casing;

Fig. 3 is a fragmentary sectional view of the upper part of the device;

Fig. 4 is a fragmentary sectional view of the lower part of the device;

Fig. 5 is a fragmentary sectional view of the upper connecting terminal of the obstacle-sensing antenna;

Fig. 6 is a perspective view of the supporting bracket for the lower end of the obstacle-sensing antenna; and Fig. 7 is a diagrammatic illustration of the electrical system.

Referring first to the mechanical structure of the device, as shown in Figs. 1 to 6, the device preferably is of the form and configuration shown in Fig. 1. In such form, the device comprises a hollow cane-like shaft 10, a hollow handle 11 attached to the upper end of said shaft and serving to support the same, a main casing 12 supported from the rear part of the handle through a hollow support 13 and serving to house operating batteries and a substantial portion of the electrical equipment, a tubular support 14 extending from the front of the handle 11, an obstacle-detection antenna 15 supported by member 14 and also by a supporting bracket 16, a casing 17 mounted at the lower end of the shaft 10 and serving to house electrical equipment associated with the ground level-sensing antenna, and an antenna 18 for the latter purpose which may be in the form of a coil wound upon a suitable support 19. The device further comprises suitable means for translating the electrical signals into signals perceptible to the user, and such means may comprise a conventional ear phone 20 having a supporting strap 21 and connected through a flexible electrical connection 22 to the electrical components within casing 12, there being preferably a plug and socket connection at 23. In use of the device, as illustrated in Fig. 1, the user's hand, represented at 24, grasps the handle 11 and holds the device so that the cane-like shaft 10 extends forwardly and downwardly, and so that the ground level-sensing antenna 18 is in proximity to the ground represented at 25. The manner in which the detection functions are performed and indicating signals are produced will be described hereinafter with reference to the electrical system.

As may be seen in Fig. 1, in the form of the device illustrated there are three manual controls for operation by the user. Two controls 26 and 27 are located on the main casing 12, while the third control 28 is located on the casing 17. Control knob 26 is the on-off and volume control. Control knob 27 serves to adjust the sensitivity of the obstacle-detection means. Control knob 28 serves to adjust the sensitivity of the ground level variation detection means. The manner in which these several controls perform their functions will be described later.

Referring further to the mechanical structure, as shown in Fig. 3, the hollow support 13 is apertured to receive an end of the handle 11 and these parts may be held together in any suitable manner, as by welding. The support 13 may be secured to the casing 12 by suitable fastening means, such as screws 29. At the front end of the handle 11, there is a connecting block 30 which serves to connect the shaft 10 and the tubular support 14 to the handle, and which also permits extension of electrical conductors from the hollow handle into the hollow members 10 and 14. To these ends, the block 30 is provided with a passage 31, a recess 32 and a passage 33. The front end of the handle 11 seats in the recess 32, and a set screw 34 serves to lock the block 30 and the handle 11 together. The tubular support 14 extends into the passage 31 and is held by a set screw 35. Similarly, the hollow shaft 10 extends into passage 33 and is held by set screw 36.

The lower casing 17, as shown in Fig. 4, is substantially square and has the cylindrical coil mandrel 19 extending therefrom. The lower part of shaft 10 extends centrally through the casing 17 and into a central bore recess or passage 37 of the mandrel 19. The casing and mandrel assembly are held on the shaft 10 by means of a set screw 38. The antenna coil 18 may comprise insulated wire wound upon and affixed to the cylindrical mandrel. As described hereinafter, the antenna coil may be inductively coupled to another coil. As the principal parts of the device are preferably formed of metal to provide a common ground, it is necessary that the coil be suitably insulated from its support. The coil may be secured to its support in any suitable manner, as by means of an adhesive cement. It will be seen in Fig. 4 that three conductors 39, 40 and 40a extend upwardly within the hollow shaft 10 from the assembly or unit at the lower end thereof, these conductors entering the shaft through an opening 41 therein. Two conductors serve to supply operating voltages to the lower unit from the batteries within the main casing 12, while the other conductor serves to convey a signal produced in the lower unit to the main unit or casing 12.

The obstacle-detection antenna 15 is in the form of a stiff bare wire, and its upper end is secured to the support 14 in the manner shown in Fig. 5. Within the end of the tubular member 14 is an insulating bushing 42 which serves to support a flanged terminal 43 which is electrically connected to a conductor 44 extending through the tubular member 14. A flanged terminal 45 is connected to the upper end of antenna 15 for engagement with the flanged terminal 43. A hollow insulating coupling member 46 threadedly engages the end of member 14 and serves to hold the flanged ends of the terminals 43 and 45 in abutting relation, said flanges being disposed within the coupling member. It will be seen that by turning the coupling member in the proper direction, the flanged ends of the terminal members may be caused to firmly engage one another so as to establish and maintain good electrical contact therebetween.

The bracket 16, which serves to hold the lower end of the antenna 15, is clearly shown in Fig. 6. The bracket has a sleeve portion 47 through which the shaft 10 extends and which is held in position on the shaft by a set screw 48. At its outer end, the bracket has a passage 49 through which the lower end portion of the antenna 15 extends, and a set screw 50 serves to secure the antenna to the bracket. It is necessary that the antenna be insulated from the metal shaft 10, and therefore the bracket 16 may be formed of insulating material.

Reference is now made to the electrical system which may be as shown in Fig. 7. The vacuum tubes 51, 52, 53, 54 and 55, and their associated circuit components and connections, are all contained within the main casing 12. The batteries, represented generally by reference character 56 in Figs. 3 and 7, may also be contained within the main casing 12. The vacuum tube 57 and its associated circuit components are contained within the casing 17.

Tube 51 forms part of a conventional high-frequency oscillator which includes a feedback transformer 58 and tank circuit 59 to which the obstacle-detection antenna 15 is connected. The frequency of this oscillator is normally at a certain value but is variable by change of loading due to an object in proximity to the antenna 15.

Tube 52 forms part of a conventional oscillator-mixer stage, the oscillator section including the feedback transformer 60 and tank circuit 61 whose condenser 62 is variable to tune the oscillator. The output of the above-mentioned variable oscillator is applied over conductor 63 to the mixer grid of tube 52. The output of the oscillator-mixer stage is taken from the plate of tube 52 and is supplied through capacitor 64 to the audio amplifier comprising tubes 53, 54 and 55. The output of the last tube is supplied to the ear phone 20.

In operation of the system as regards obstacle detection, the oscillator section of the oscillator-mixer stage is tuned to a predetermined frequency, e. g. about 2 mc., and remains so tuned. The variable oscillator is tuned to the same frequency, and in the absence of any variation of its frequency, there is no output from the oscillator-mixer stage. It should be noted that the antenna 15 is shielded from influence by the user's body by the metal cane shaft 10. When the frequency of the variable oscillator changes from its normal value, due to an object in proximity to antenna 15, an audio frequency signal is produced whose frequency is the difference between the frequencies of the two oscillators. This signal is amplified by the amplifier stages and is supplied to the ear phone where it is translated into an audible signal.

Referring now to the ground-detection portion of the system, the ground detection antenna 18 may be in the form of an open end coil inductively associated with coil 65 across which is connected a tuning condenser 66. In one actual model the coil 65 consists of five turns of No. 18 wire wound on a diameter of about 1½ inches and the coil 18 consists of about 55 turns of No. 18 wire on a diameter of about 1½ inches. Coil 18 and coil 65 are in close proximity and inductively coupled, and in fact, may actually be interwound with each other. Tube 57 is a subminiature gas triode arranged in a self-quenching super-regenerative circuit so as to have two stable modes of operation, one as a gas-discharge tube and the other as a normal triode. This type of tube has been employed in the past in a self-quenching super-regenerative circuit for radio control of a relay. In the present instance it is utilized in an arrangement as shown so that the loading of the antenna 18 changes the plate current and causes the tube to go from stable operation as a gas-discharge tube to stable operation as a triode.

When the antenna 18 is within a predetermined distance from the ground, as determined by the adjustment of condenser 66, the circuit oscillates at high frequency, e. g., about 50 mc., and no signal passes through the audio amplifier to the ear phone. However, when the antenna 18 is beyond the pre-set distance from the ground, the circuit oscillates at audio frequency and supplies an audio frequency signal to the audio amplifier via conductor 39. It will be seen that this signal is amplified by tubes 54 and 55 and is supplied to the ear phone.

The operation of the ground level detector is dependent upon the oscillator circuit having two modes of operation. One of these modes requires its operation as a self-quenching superregenerative detector operating to periodically block conduction. The other mode is as a radio frequency oscillator. It is the object sensing antenna, or coil 18, which determines which mode of operation is effective, and this is accomplished as a result of the loading of this antenna. Loading is produced by the presence of a conductor, such as the ground, and at a predetermined distance from the ground, as determined by circuit parameters, said antenna will be loaded, whereas at distances beyond this predetermined distance the antenna will be effectively unloaded. In its unloaded condition, the operation is in the mode of a self-quenching superregenerative detector and the radio frequency oscillations are periodically reduced in amplitude when the grid becomes sufficiently negative. Under these unloaded conditions, the grid capacitor and grid leak resistor form an RC circuit whose time constant along with the tube characteristics and amplitude of radio frequency oscillation determine a quenching frequency. The tube will then oscillate intermittently as the voltage developed across the grid capacitor, as a result of grid current, periodically blocks the tube, stopping conduction therethrough and reducing the plate current to zero or a very low value. In the presence of a load, however, blocking cannot occur because the amplitude of oscillations is materially reduced. Under these circumstances the oscillator merely oscillates at radio frequency without change in amplitude, and the grid current does not change in magnitude to cause tthe tube to block.

The frequency of oscillation of the circuit is determined by the tank circuit constants. The frequency of blocking is determined by the grid capacitor and grid leak resistor time constants. The design of coils 65 and 18 as well as the selection of a B+ voltage and load resistor depend to a certain extent upon the characteristics of the particular tube employed and upon the loading to be expected in service. Since this loading is very much dependent upon the circuit elements themselves due to the high frequency employed, it is difficult to calculate what will work and so we have simply tried experimental configurations until we have found satisfactory ones.

The ground level detector arrangement in the illustrated embodiment is characterized in that it is either on or off as far as the low frequency signal is concerned. While this detection arrangement is preferred, it is possible to use an arrangement similar to that employed for obstacle detection, which would give a continuously increasing signal with increasing distance between the antenna and the ground level beyond a pre-set distance.

In using the device, it requires very little practice on the part of the user to hold the device with the antenna 18 at the proper distance from the ground. If the device is not properly held, that fact will be apparent to the user. The normal practice is to lift the cane tip occasionally to be reassured that the device is working properly and that distance judgments are correct. If the cane tip is allowed to drop, it will strike the ground, and if it is raised too much a signal will be given. With a little practice, a user is easily able to hold the device with the cane tip at the proper elevation above the ground.

In the use of the device, the user is apprised whenever the antenna 15 senses a proximate object, and the user is also apprised whenever the antenna 18 senses a drop in the ground level, as at the approach of a curb or downward steps. Whenever the user approaches upward steps, he will be apprised of this fact by the sensing action of the antenna 15, as the upward steps will represent an obstacle being approached. Preferably the two detecting systems employed are adjusted so as to give signals whose frequencies are sufficiently far apart so that one signal is distinguishable from the other.

In a physical embodiment of the device which is entirely satisfactory, the tubes and values of the circuit elements are as indicated in Fig. 7, which shows the circuit of that embodiment.

While a preferred embodiment of the invention has been illustrated and described, it will be apparent that various modifications and other embodiments are possible. For example, instead of using an audible signal, electric or tactile stimulation could be used. Also the batteries and some circuit elements may be placed a pack or packs separate from the cane and may be connected thereto by shielded cable. Various other modifications will be apparent to those skilled in the art.

It should be noted further that, while the invention has been illustrated and described as applied to a guidance device for blind persons, it is contemplated that the invention shall be applicable to any other useful purpose in the detection of proximate objects or the distance of objects. Moreover, each of the detection arrangements employed in the system illustrated and described is useful by itself, although the two are useful together in a guidance device for the blind.

We claim:

1. A portable device for use by the blind to detect the presence and proximity of an object, comprising a high frequency oscillator tuned to a fixed super-audio frequency, a second high frequency oscillator tuned to the same frequency, a cane shaft to be held by the hand of the user, an antenna supported by said shaft and coupled to said second oscillator to vary the frequency thereof according to the proximity of an object, means for mixing the outputs of said oscillators to produce an audio frequency signal whose frequency is determined by the proximity of the object, sound reproducing means capable of producing sound of varying pitch according to its operating frequency, and means for supplying said audio frequency signal to said sound reproducing means, whereby the latter indicates both the presence of the object and its proximity.

2. An object detection device, comprising an oscillatory circuit including a gas triode having two stable modes of operation, one as a gas-discharge tube and the other similar to operation of a grid-controlled vacuum tube, an object sensing antenna coupled to said circuit to effect change of the mode of operation of said triode in response to presence of an object within a predetermined distance from the antenna, said circuit oscillating at one frequency during one mode of operation of the triode and at another frequency during the other mode of operation of the triode, and indicating means connected to said circuit and operable only in response to the operation of said triode produced by proximity of an object, whereby the presence of an object or lack thereof within said predetermined distance from the antenna is indicated.

3. A ground-level detection device for use by the blind, comprising an oscillatory circuit including a gas triode having two stable modes of operation, one as a gas-discharge tube and the other similar to operation of a grid-controlled vacuum tube, a ground-level sensing antenna coupled to said circuit to effect change of the mode of operation of said triode in response to change of the ground level with reference to a predetermined distance between it and the antenna, said circuit oscillating at audio frequency during one mode of operation of the triode and at super-audio frequency during the other mode of operation of the triode, and indicating means connected to said circuit and operable only in response to the audio frequency output of said circuit, whereby an indication or lack thereof indicates the position of the ground level relative to said antenna with respect to said predetermined distance.

4. A ground-level detection device for use by the blind, comprising an oscillatory circuit including a gas triode having two stable modes of operation, one as a gas-discharge tube and the other similar to operation of a grid-controlled vacuum tube, a cane shaft to be held by the hand of the user, a ground-level sensing antenna supported at the lower end of said shaft and coupled to said circuit to effect change of the mode of operation of said triode in response to change of the ground level with reference to a predetermined distance between it and the antenna, said circuit oscillating at audio frequency during one mode of operation of the triode and at super-audio frequency during the other mode of operation of the triode, and indicating means connected to said circuit and operable only in response to the audio frequency output of said circuit, whereby an indication or lack thereof indicates the position of the ground level relative to said antenna with respect to said predetermined distance.

5. An object detection device, comprising an oscillator circuit having two modes of operation, one as a self-quenching superregenerative detector operating to periodically block conduction and the other as a radio frequency oscillator, an object sensing antenna coupled to said circuit and determining the mode of operation depending upon loading produced by the presence of a conductor, such as the ground, a predetermined distance from said antenna, such that at relatively unloaded operation the oscillator acts as the self-quenching superregenerative detector while at loaded operation the oscillator behaves as a radio frequency oscillator, and indicating means connected to said circuit and operable only in response to the operation of said triode produced by proximity of an object, whereby the presence of an object or lack thereof within said predetermined distance from the antenna is indicated.

References Cited in the file of this patent

UNITED STATES PATENTS

| | | |
|---|---|---|
| 2,112,826 | Cook | Apr. 5, 1938 |
| 2,333,119 | Packard | Nov. 2, 1943 |
| 2,421,771 | Browing | June 10, 1947 |
| 2,422,542 | Gustafson | June 17, 1947 |
| 2,490,238 | Simons | Dec. 6, 1949 |
| 2,496,639 | Richardt | Feb. 7, 1950 |
| 2,605,393 | Holm | July 29, 1952 |
| 2,646,559 | Nutzler | July 21, 1953 |
| 2,791,762 | Berry | May 7, 1957 |

FOREIGN PATENTS

| | | |
|---|---|---|
| 20,170 | Australia | Jan. 9, 1936 |